United States Patent
Khafagy et al.

(10) Patent No.: US 10,527,018 B2
(45) Date of Patent: Jan. 7, 2020

(54) VEHICLE AND START/STOP METHOD FOR A VEHICLE ENGINE

(71) Applicant: FORD GLOBAL TECHNOLOGIES, LLC, Dearborn, MI (US)

(72) Inventors: Hafiz Shafeek Khafagy, Dearborn, MI (US); Eric Michael Rademacher, Royal Oak, MI (US); Hank L. Kwong, Farmington Hills, MI (US); Siraj Siddiqui, Lasalle (CA); Giuseppe Domenico Suffredini, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 311 days.

(21) Appl. No.: 15/176,315

(22) Filed: Jun. 8, 2016

(65) Prior Publication Data
US 2017/0356415 A1    Dec. 14, 2017

(51) Int. Cl.
| | |
|---|---|
| *F02N 11/08* | (2006.01) |
| *B60W 10/18* | (2012.01) |
| *B60W 10/06* | (2006.01) |
| *B60K 6/48* | (2007.10) |
| *B60W 40/08* | (2012.01) |

(52) U.S. Cl.
CPC ............ *F02N 11/0818* (2013.01); *B60K 6/48* (2013.01); *B60W 10/06* (2013.01); *B60W 10/182* (2013.01); *B60W 2040/0881* (2013.01); *B60W 2520/06* (2013.01); *B60W 2540/10* (2013.01); *B60W 2540/16* (2013.01); *B60W 2710/186* (2013.01); *F02N 2200/0802* (2013.01); *F02N 2200/101* (2013.01); *F02N 2300/2011* (2013.01); *Y02T 10/48* (2013.01)

(58) Field of Classification Search
CPC ............ F02N 11/0818; F02N 11/0833; F02N 11/0822; F02N 11/0803; F02N 11/0855; F02N 11/0811; F02N 99/00; F02N 99/002; F02N 2200/101; F02N 2200/0802; F02N 2200/102; F02N 2200/0803; F02N 2200/105; B60W 10/02; B60W 10/06; B60W 10/184; B60W 10/11; B60W 10/10; B60W 2540/12; B60W 2540/16; B60W 30/18018; B60W 30/18; B60W 30/18054
See application file for complete search history.

(56) References Cited

U.S. PATENT DOCUMENTS

| | | | | |
|---|---|---|---|---|
| 3,154,168 | A * | 10/1964 | Wilmot | B60K 28/14 180/279 |
| 5,653,659 | A * | 8/1997 | Kunibe | B60W 10/02 477/110 |
| 6,190,284 | B1 * | 2/2001 | Kuroda | B60K 6/485 123/179.4 |

(Continued)

FOREIGN PATENT DOCUMENTS

DE    112014003574 T5    4/2016

*Primary Examiner* — George C Jin
(74) *Attorney, Agent, or Firm* — David Kelley; Brooks Kushman P.C.

(57) ABSTRACT

A vehicle engine start/stop control method includes shifting an automatic transmission to a park or neutral position and auto-stopping the engine in response the automatic transmission being in the park or neutral position for a predetermined period of time that begins with a shift of the automatic transmission to the park or neutral position.

9 Claims, 2 Drawing Sheets

(56) References Cited

U.S. PATENT DOCUMENTS

| | | | |
|---|---|---|---|
| 6,502,908 B1* | 1/2003 | Mueller | B60T 7/042 188/DIG. 2 |
| 6,676,565 B2* | 1/2004 | Mizutani | F02D 41/0225 477/111 |
| 8,690,731 B1* | 4/2014 | Sangameswaran | F02N 11/0822 477/111 |
| 8,702,563 B1 | 4/2014 | Sangameswaran et al. | |
| 9,056,606 B1 | 6/2015 | Rademacher et al. | |
| 2005/0246081 A1* | 11/2005 | Bonnet | B60T 7/122 701/38 |
| 2011/0077830 A1 | 3/2011 | Lochocki, Jr. et al. | |
| 2011/0207579 A1* | 8/2011 | Liu | B60W 30/18018 477/183 |
| 2012/0316740 A1 | 12/2012 | Funakoshi et al. | |
| 2013/0124066 A1* | 5/2013 | Pebley | B60W 10/26 701/102 |
| 2014/0088854 A1* | 3/2014 | Smague | F02N 11/084 701/112 |
| 2014/0149022 A1* | 5/2014 | Geissenhoener | B44D 3/18 701/112 |
| 2014/0235406 A1* | 8/2014 | Sangameswaran | B60W 10/06 477/99 |
| 2016/0244039 A1* | 8/2016 | Rizzo | B60T 8/322 |

* cited by examiner

VEHICLE AND START/STOP METHOD FOR A VEHICLE ENGINE

TECHNICAL FIELD

The present disclosure relates to control systems for vehicle engines.

BACKGROUND

Hybrid and micro-hybrid vehicles may include control systems that are configured to shut down the engine of the vehicle in order increase fuel economy and reduce emissions.

SUMMARY

A vehicle includes an engine, automatic transmission, and a controller. The engine is configured to auto-start and auto-stop. The automatic transmission includes a gear selector and the controller is programmed to, in response to the gear selector being in a neutral position for a predetermined time period that begins with a shift of the gear selector into the neutral position, command the engine to auto-stop.

A vehicle includes an engine, automatic transmission, and a controller. The engine is configured to auto-start and auto-stop. The automatic transmission includes a gear selector and the controller is programmed to, in response to the gear selector being in a park position for a predetermined time period that begins with a shift of the gear selector into the park position, command the engine to auto-stop.

A vehicle engine start/stop control method includes shifting an automatic transmission to a park or neutral position and auto-stopping the engine in response to the automatic transmission being in the park or neutral position for a predetermined period of time that begins with a shift of the automatic transmission to the park or neutral position.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
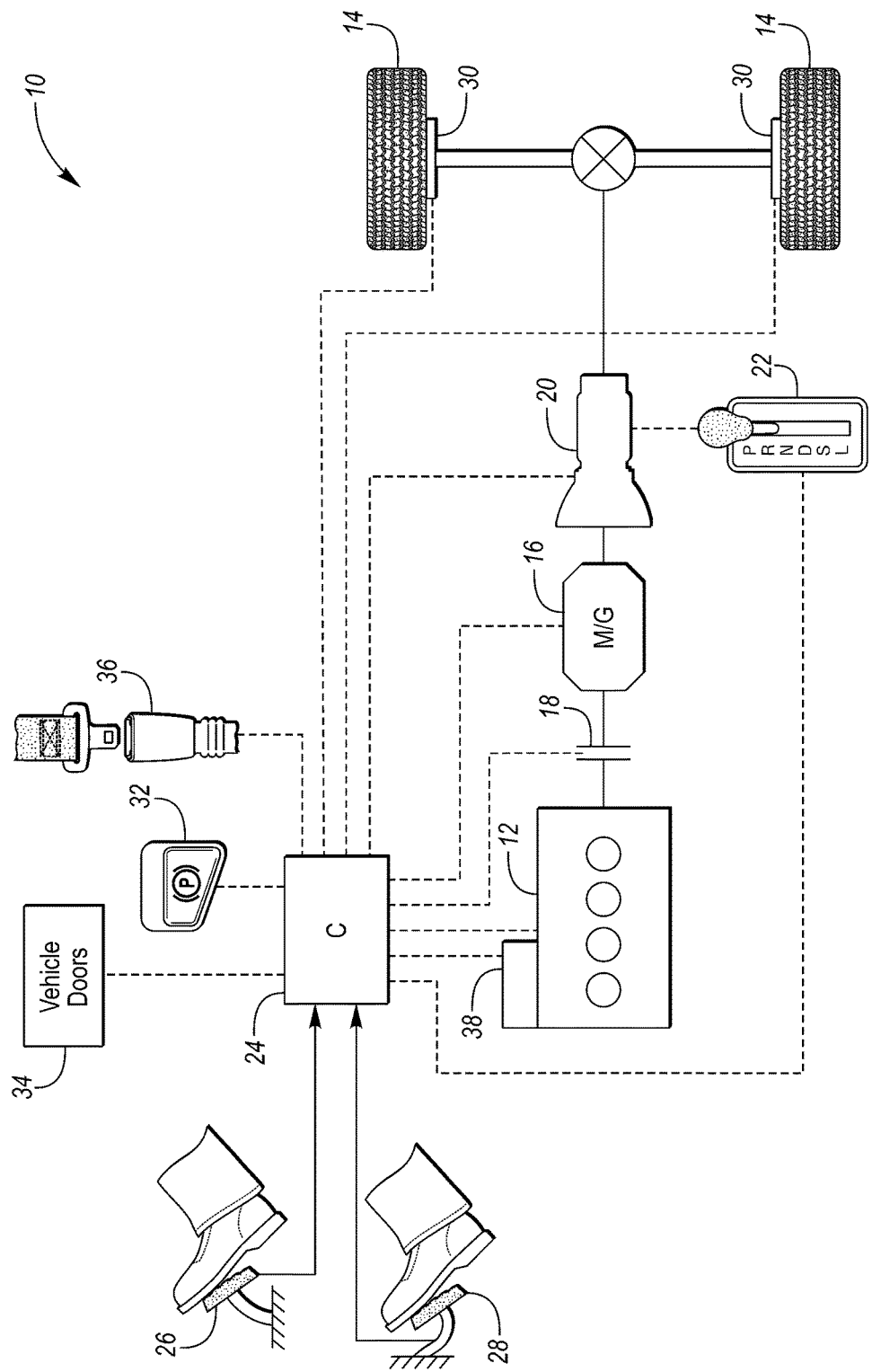
FIG. 1 is a schematic diagram representative of a vehicle and a vehicle powertrain.

Referring to FIG. 1, a diagram representative of a vehicle 10 and a vehicle powertrain is illustrated. The vehicle 10 includes an engine 12 that is configured to transmit power through the powertrain and to a pair of drive wheels 14. The vehicle 10 may be a hybrid vehicle that includes a motor/generator (M/G) 16 that is also configured to transmit power through the powertrain and to the pair of drive wheels 14. The M/G 16 may be configured to operate as both a motor and a generator. When operating as a motor, the M/G 16 may receive electrical power from a traction battery (not shown). When operating as a generator the M/G 16 may deliver electrical power to the traction battery in order to recharge the traction battery. The engine 12 may be configured to selectively couple to and decouple from the powertrain through an engine disconnect clutch 18. The powertrain may also include a transmission (or gearbox) 20. The transmission 20 may be an automatic transmission that includes gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft and a transmission input shaft. The transmission 20 may also include a gear selector 22 allows an operator to shift the transmission 20 between park (P), reverse (R), neutral (N), drive (D), sport (S), and low gear (L) positions.

The powertrain further includes an associated controller 24 such as a powertrain control unit (PCU). While illustrated as one controller, the controller 24 may be part of a larger control system and may be controlled by various other controllers throughout the vehicle 10, such as a vehicle system controller (VSC). It should therefore be understood that the controller 24 and one or more other controllers can collectively be referred to as a "controller" that controls various actuators in response to signals from various sensors to control functions such as starting/stopping the engine 12, operating the M/G 16 to provide wheel torque or charge a battery, select or schedule shifts of the transmission 20, transition the transmission 20 to the desired gear based on an input from the gear selector 22, open/close the engine disconnect clutch 18, etc. The controller 24 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine 12 or vehicle 10.

Control logic or functions performed by the controller 24 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 24. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 26 may be used by the operator of the vehicle 10 to provide a demanded torque, power, or drive command to propel the vehicle 10. In general, depressing and releasing the accelerator pedal 26 generates an accelerator pedal position signal that may be interpreted by the controller 24 as a demand for increased power or decreased power, respectively. A brake pedal 28 may also be used by the operator of the vehicle 10 to provide a demanded braking torque to slow the vehicle. In general, depressing and releasing the brake pedal 28 generates a brake pedal position signal that may be interpreted by the controller 24 as a demand to decrease the vehicle speed. Based upon inputs from the accelerator pedal 26 and brake pedal 28, the controller 24 commands the torque to the engine 12, M/G 16, and/or friction brakes 30. The friction brakes 30 may include an electronic parking brake. The electronic parking brake may be activated by the controller 24 depending on specific conditions of the vehicle 10. The electronic parking brake may also be activated when the vehicle operator selects to activate the electronic parking brake through a user interface 32. The user interface 32 may be a push button that activates an electronic switch to engage the electronic parking brake.

The controller 24 may be configured to receive signals from sensors or switches that determine the current open or closed states of the vehicle doors 34, including the driver door and all of the passenger doors. The controller 24 may also be configured to receive signals from sensors or switches that determine the current buckled or unbuckled states of the vehicle seatbelts 36, including the driver seat belt and all of the passenger seat belts.

The engine 12 may be configured to auto-start or auto-stop based on various conditions of vehicle 10. The controller 24 may command a starter motor (which alternatively may be an integrated starter/generator) 38 to turn the crankshaft of the engine 12 in order to start the engine 12. Alternatively, the controller 24 may command the M/G 16 to turn the crankshaft of the engine 12 by closing the engine disconnect clutch 18.

The controller 24 may be configured to receive various states or conditions of the various vehicle components illustrated in FIG. 1 via electrical signals. The electrical signals may be delivered to the controller 24 from the various components via input channels. Additionally, the electrical signals received from the various components may be indicative of a request or a command to change or alter a state of one or more of the respective components of the vehicle 10. The controller 24 includes output channels that are configured to deliver requests or commands (via electrical signals) to the various vehicle components. The controller 24 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the vehicle configuration described herein is merely exemplary and is not intended to be limiting. Other non-hybrid or hybrid vehicle configurations should be construed as disclosed herein. Other vehicle configurations may include, but are not limited to, micro-hybrid vehicles, series hybrid vehicles, parallel hybrid vehicles, series-parallel hybrid vehicles, plug-in hybrid electric vehicles (PHEVs), or any other vehicle configuration known to a person of ordinary skill in the art.

Figure 2:
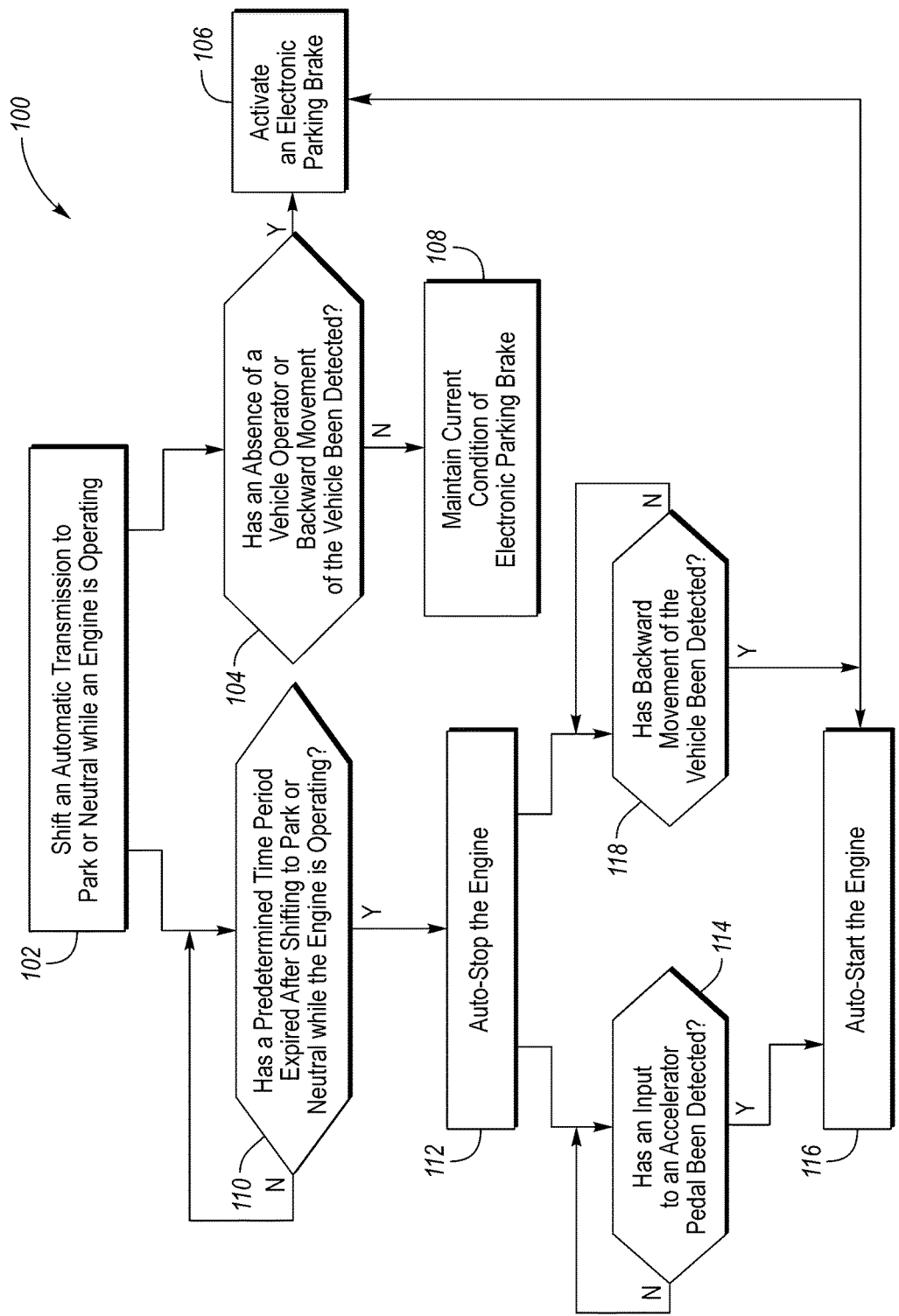
FIG. 2 is a flowchart illustrating a method of auto-stopping and auto-starting an engine in the vehicle.

Referring to FIG. 2, a method 100 of auto-stopping and auto-starting the engine 12 is illustrated. The method 100 may be implemented through control logic and/or algorithms that are stored within the controller 24. The method begins at block 102 when the gear selector 22 of the automatic transmission 20 is shifted into either a park position or a neutral position while the engine 12 is operating. The shift of the gear selector 22 to the park or neutral position may be a shift from any of the other positions on the gear selector 22 including the drive position, sport position, and low-gear position. Once the transmission 20 has been shifted into either the park or neutral position while the engine 12 is operating, the method determines at block 104 if a condition indicative of an absence of a vehicle operator or a backward movement of the vehicle 10 has been detected. A condition indicative of an absence of the vehicle operator may be determined based on detecting an opening of the driver's door or an unbuckling of the driver's seat belt. If a condition indicative of an absence of the vehicle operator or backward movement of the vehicle 10 is detected, the method moves on to block 106 where the electronic parking brake is activated. If a condition indicative of an absence of the vehicle operator and backward movement of the vehicle is not detected, the method moves on to block 108 where the current condition of the electronic parking brake is maintained.

Additionally, after the transmission 20 has been shifted into either the park or neutral position while the engine 12 is operating at block 102, the method also determines at block 110 if a predetermined time period has expired after shifting into either the park or neutral position. If the predetermined time period has not expired, the method 100 returns to the start of block 110 as long as the transmission remains in the park or neutral position. If the predetermined time period has expired, the method 100 moves on to block 112 where the engine 12 is commanded to auto-stop. Allowing the engine 12 to auto-stop after the predetermined time period has expired may be indicative of an intention of the vehicle operator to remain in the park or neutral position. Auto-stopping the engine 12 after determining the intention of the vehicle operator to remain in the park or neutral position, by allowing the predetermined time period to expire, may increase fuel economy and reduce fuel emissions by preventing multiple auto-starts and auto-stops that may occur when the vehicle operator shifts into the park or neutral position and shortly thereafter shifts out of the park or neutral position. The predetermined time period may be configured to restart in response to detecting accelerator pedal input prior to the expiration of the predetermined time period. Once the engine 12 has auto-stopped, the method 100 determines if an accelerator pedal input has been detected at block 114. If an accelerator pedal input is not been detected, the method 100 returns to the start of block 110 as long as the engine 12 remains auto-stopped. If an accelerator pedal input is detected, the method moves on to block 116 where the engine 12 is commanded to auto-start. After the engine has been auto-stopped at block 112, the method also determines if backward movement of the vehicle has been detected at block 118. If backward movement of the vehicle is not detected, the method returns to the start of block 118 as long as the engine remains auto-stopped. If backward movement of the vehicle is detected, the method 100 moves on to block 116 where the engine 12 is commanded to auto-start. If backward movement of the vehicle is detected, the method may also command the electronic parking brake to activate at block 106.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising: an engine configured to auto-start and auto-stop; an automatic transmission having a gear selector; and a controller programmed to, in response to the gear selector being in a park position for a predetermined time period that begins with a shift of the gear selector into the park position, command the engine to auto-stop
    wherein the controller is programmed to, in response to detecting accelerator pedal input while the engine is auto-stopped and the gear selector is in the park position, command the engine to auto-start.

2. The vehicle of claim 1, further comprising an electronic parking brake, wherein the controller is programmed to, in response to detecting an absence of a vehicle operator while the gear selector is in the park position, activate the electronic parking brake.

3. The vehicle of claim 2, wherein detecting the absence of the vehicle operator includes detecting an unbuckling of a seat belt.

4. The vehicle of claim 2, wherein detecting the absence of the vehicle operator includes detecting an opening of a driver door.

5. The vehicle of claim 1, wherein the shift of the gear selector is from a drive position to the park position.

6. The vehicle of claim 1, wherein the shift of the gear selector is from a sport position to the park position.

7. A vehicle engine start/stop control method comprising: shifting an automatic transmission to a park or neutral position; and auto-stopping the engine in response to the automatic transmission being in the park or neutral position for a predetermined period of time that begins with a shift of the automatic transmission to the park position
    commanding the engine to auto-start in response to detecting backward movement of the vehicle while the engine is auto-stopped and the transmission is in the park position.

8. The method of claim 7, further comprising commanding the engine to auto-start in response to detecting accelerator pedal input while the engine is auto-stopped and the transmission is in the park position.

9. The method of claim 7, further comprising restarting the predetermined time period in response to detecting accelerator pedal input prior to expiration of the predetermined period of time.

* * * * *